3,235,444
METHOD FOR THE UTILIZATION OF SLUDGE PRODUCED BY WASTE WATER CLARIFICATION IN A PAPER MILL
Horst Kruger, Seltmans, Allgau, Germany, assignor to Unilever N.V., Rotterdam, Netherlands, a corporation of the Netherlands
Filed June 20, 1962, Ser. No. 203,744
Claims priority, application Germany, June 27, 1961, P 27,583
5 Claims. (Cl. 162—190)

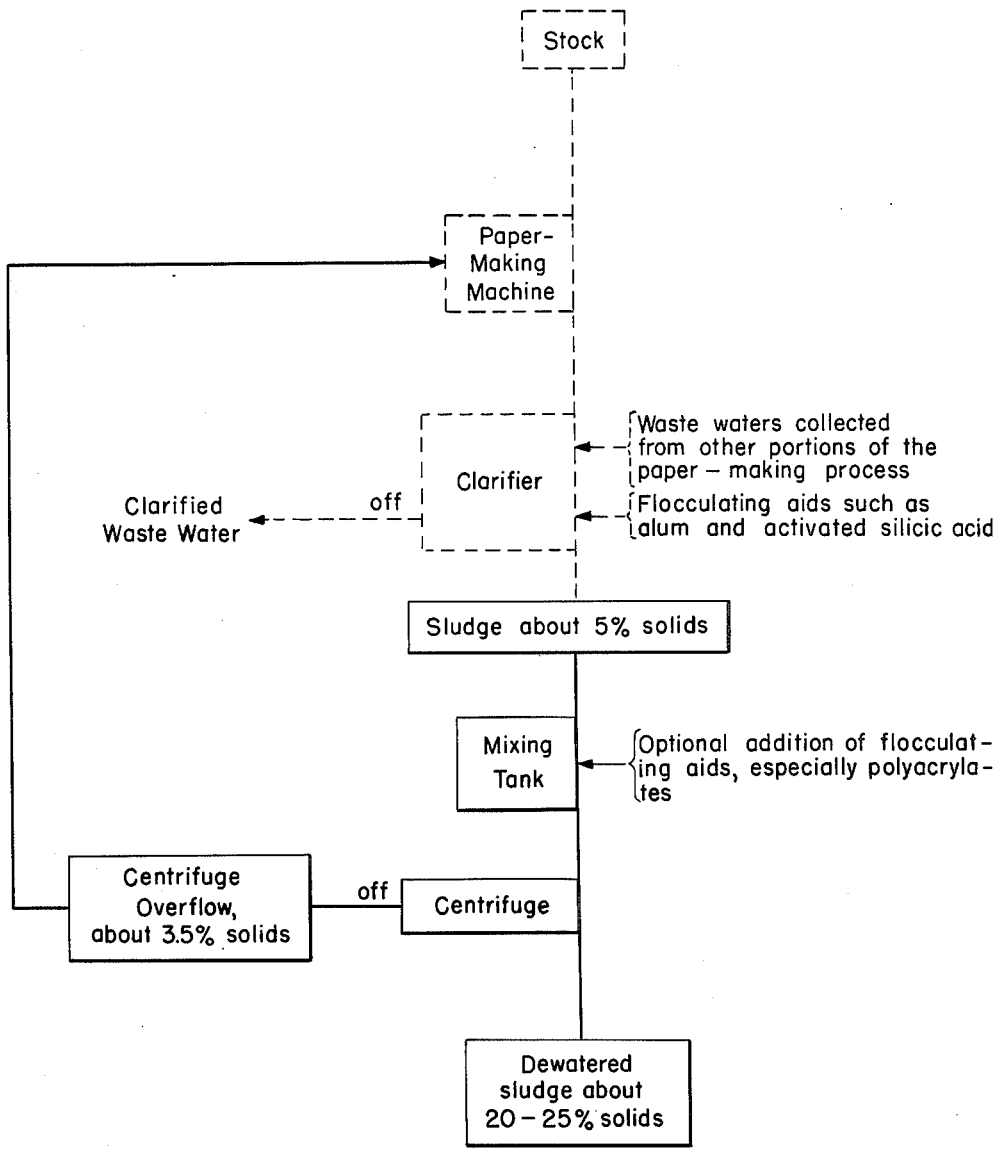

This invention relates to a process for purification of waste water in paper mills.

The purification of waste water from paper mills by treating it in special installations with flocculating agents, such as a water-soluble aluminium salt, and subjecting the flocculent precipitate so produced to sedimentation is known. In this way, the very fine solid materials, which can otherwise only be sedimented with difficulty, can be separated with the help of the flocculent precipitate formed, so that purification of the waste water is possible.

In this process, the solid materials precipitate in a more or less compacted form. These solid materials contain, in the main, the solid particles reaching the flocculation and sedimentation processes with the waste water from the mill and, consequently, consist essentially of fibres and fillers. In addition, the sludge contains a certain amount of metal hydroxides, particularly from the flocculating agent. Since not only the true waste water from the manufacture of paper, but also the dirty water which arises in cleansing reaches the waste water conduit, the waste waters also contain particles of dirt, and it is essentially just these particles of dirt which make the re-use of the compacted sludge in the manufacture of paper so difficult. Attempts have been made in many ways to re-use the solid materials precipitated in the purification of the waste water directly for the manufacture, but they have failed on account of the relatively poor properties of this material, particularly on account of the particles of dirt already mentioned that are contained in the precipitated sludge.

For this reason the direct reintroduction of the precipitated sludge into the manufacture must be renounced and attempts must consequently be made, according to means and desire, to dewater this sludge, which takes up far too much storage space in the liquid form, to such an extent that it can either be stored in heaps or treated in some way, for example, by burning. In principle, two processes have proved valuable for this dewatering of the sludge, namely filtration on the one hand and centrifuging on the other hand. The use of filters has the disadvantage that the necessary apparatus for it is very expensive both to run and to purchase, even though it has the great advantage of making it possible to obtain practically the whole of the solid material from the sludge in dewatered form. Because of this and other disadvantages of filtration, quite early attempts were made to dewater the sludge by means of centrifuges, such as skimming centrifuges or decanting centrifuges, and it was to be expected that the best results from the standpoint of economy should be obtained with continuous worm or screw-type centrifuges (such as are generally described for example in British patent specification 804,330). However, the use of centrifuges has the disadvantage that the overflow contains relatively large amounts of solid material, which is due to the fact that not all the particles in the sludge can actually be brought to separate in a satisfactory manner by centrifugal force.

As already mentioned, centrifuges have the disadvantage that considerable amounts of solid materials are still contained in the overflow, and attempts have been made to remove this disadvantage by feeding the overflow from the centrifuges back into the treatment tanks for flocculation and sedimentation. However, it is found that in this procedure the finest solid materials, which are not separable by the centrifuge, continuously build up in the circulation system, which leads to a progressive decrease in the efficiency of the centrifuge, and finally practically no solid materials can be separated with the centrifuge. In order to avoid this effect, attempts have been made to subject the sludge before it reaches the centrifuge, or the overflow from the centrifuge, to an additional chemical treatment, but it has been found that a practically useful effect can only be obtained with extraordinarily large amounts of chemicals.

It is an object of the invention to provide an improved process for the purification of waste waters in paper mills.

According to the present invention there is provided a process for the purification of waste waters in paper mills in which the waste water is purified by flocculation and sedimentation and the sludge produced is passed through a centrifuge, wherein the overflow from the centrifuge is fed to a paper-making machine.

The figure is a flow sheet illustrating the steps of the process.

Thus, in the process of the invention, the overflow from the centrifuge is passed not directly into the inlet of the flocculation installation but back to the actual paper manufacture. It has been found, surprisingly, that the dirt, which is otherwise so harmful for returning to the mill, is removed together with the fibres almost completely, so that the overflow contains the fillers and finest fibre particles in so pure a form that they have no disadvantageous action in the manufacture of the paper. This return feed leads to an essential saving in fillers and fibre in the mill and this saving far exceeds the cost of the waste water treatment. Preferably, the aluminium salts that were used as flocculating agents are recovered from the sludge and returned to the paper-making machine together with the overflow.

Thus, in the process according to the invention, the sludge fraction consisting essentially of fillers and mucilaginous materials is returned to the mill and the remaining fraction containing the fibres is used in a different manner. In this way, practically the whole of the solid matter can be separated from the sludge and the previously mentioned build up of the finest solid materials in the circulation system can be avoided. Thus, in this way, one has a very simple sludge treatment which brings an additional profit through the saving in the mill, whereas otherwise the purification of the waste water only causes additional expense.

The degree of separation in the centrifuge is largely dependent on the composition and solid content of the sludge fed to it. However, since for complete separation of the dirt, at least 40% of the precipitated solid matter should be separated in the centrifuge, it is necessary, in a number of cases, to improve the degree of separation in the centrifuge by subjecting the sludge to a pre-treatment before centrifuging, preferably using an organic flocculating agent, for example one based on a polyacrylate. The degree of separation in the centrifuge can be largely governed by the amount of this agent added, and that degree of separation can be set which is necessary to separate the dirt completely.

In most cases, the return of the solid material in the overflow from the centrifuge to the paper-manufacturing process does not affect the dewaterability on the paper-making machine. If the dewaterability should nevertheless be adversely affected, this can be remedied in a simple manner by adjusting the sludge to a pH of above 9 before centrifuging, preferably by the addition of lime, whereby the aluminium compounds, which are useful for the paper manufacture, can be recovered. The overflow from the centrifuge is then adjusted back to the usual pH (4.5–5) before reintroduction into the mill by the addition of, for example, sulphuric acid. A considerable improvement in the dewaterability is obtained in this way. However, such a measure is necessary practically only with very fast-running machines.

Thus, the process according to the invention consists fundamentally in the fact that the waste water undergoes purification by flocculation and sedimentation in a manner known in itself and that the sludge so precipitated is dewatered in a centrifuge, the solid-containing overflow from the centrifuge, in contrast to previous processes, not being passed into the waste water and back to the waste water treating installation, but being used directly in the manufacture of the paper. This process is even possible in the case of high-quality papers since it is possible to separate the dirt in the centrifuge and so to send relatively pure raw material back to the manufacture. The degree of separation and consequently the purity of the sludge can be adjusted by the addition of organic flocculating agents before centrifuging.

The following example illustrates the invention.

*Example*

400 m.$^3$ of waste water with a solid matter content of 300 mg./l. arose per hour in a paper mill. The waste water was purified in an installation by flocculation and sedimentation according to the suspension circulation process by adding aluminium sulphate solution to the waste water at a pH of 6 and thickening the flocculent precipitate so formed by means of activated silicic acid in order to obtain a better sedimentation. The waste water treated in this way left the mill with a solid content of 20 mg./l. and was pure enough to be passed to the drains. The sludge produced had a mean solid content of 5%, the ash content of this solid material being about 50%. 40% of the solid material was separated in compact form with a solid content of about 20% by a means of a continuous worm centrifuge. The overflow still contained a solid content of about 3.5% and was fed back to the paper machine on which essentially wood-free printing and writing paper was being prepared.

The dirt was separated with the solid material so that the solid material in circulation was purer than the solid material in the centrifuge product. The purification effect with respect to the dirt was increased still further when 50 g./m.$^3$ of a polyacrylate flocculating agent were added to the sludge before centrifuging, the degree of separation in the centrifuge being raised to 55% and the difference in purity between the two types of solid material from the centrifuge became greater.

What is claimed is:

1. In the purification of waste water from a paper-making process wherein waste water is produced by a paper-making machine, and wherein waste water from the paper-making process, including the waste water from said paper-making machine, is treated by sedimentation to produce a clarified waste water and a sludge, the combination therewith of the steps of centrifuging said sludge to produce a dewatered sludge and a partially clarified overflow, and returning said partially clarifying overflow to said paper-making machine.

2. A process according to claim 1 in which the degree of separation in the centrifuge is at least 40%, reckoned on the solid material fed.

3. A process according to claim 1 in which an organic flocculating agent is added to the sludge before centrifuging.

4. A process according to claim 1 in which the sludge is adjusted to a pH of above 9 before centrifuging and the overflow is brought back to a pH of about 4.5 to 5 before it is fed to the paper-making machine.

5. A process according to claim 1 in which the centrifuge is a continuous worm centrifuge.

References Cited by the Examiner

UNITED STATES PATENTS

| 1,873,598 | 8/1932 | Jones | 210—66 |
| 2,980,609 | 4/1961 | House | 210—54 |
| 3,007,519 | 11/1961 | Hollis | 162—264 |

FOREIGN PATENTS

| 804,330 | 11/1958 | Great Britain. |

OTHER REFERENCES

A Dictionary of Paper and Paper-Making Terms, Labarre, published by Sweets and Zeitlinger in Amsterdam, 1937, pp. 256 and 257.

Applebaum: Reclaimer Treatment of White and Waste Waters, pages 582, 584, 586, from Paper Industry and Paper World, July 1946.

DONALL H. SYLVESTER, *Primary Examiner.*

MORRIS O. WOLK, WILLIAM B. KNIGHT, *Examiners.*